United States Patent [19]

Parker, Sr.

[11] Patent Number: 5,167,772
[45] Date of Patent: Dec. 1, 1992

[54] APPARATUS FOR PYROLYSIS OF TIRES AND WASTE

[76] Inventor: Thomas H. Parker, Sr., Box 265 R.D. #2, Marathon, N.Y. 13803

[21] Appl. No.: 526,280

[22] Filed: May 21, 1990

[51] Int. Cl.$^5$ .................................................. C10B 31/00
[52] U.S. Cl. ................................ 202/105; 100/232; 201/6; 201/25; 202/136; 202/262; 414/173; 414/198
[58] Field of Search ....................... 201/6, 25; 202/136, 202/262, 104; 414/157, 161, 173, 198, 217; 110/109, 223, 289, 290; 585/241; 100/232

[56] References Cited

U.S. PATENT DOCUMENTS

| | | | |
|---|---|---|---|
| 1,236,884 | 8/1917 | Seaman | 201/25 |
| 4,058,205 | 11/1977 | Reed | 202/136 |
| 4,133,259 | 1/1979 | Pelton | 110/109 |
| 4,201,129 | 4/1980 | Matthys | 414/198 |
| 4,217,175 | 8/1980 | Reilly | 202/118 |
| 4,401,513 | 5/1983 | Brewer | 202/97 |
| 4,402,791 | 9/1983 | Brewer | 202/97 |
| 4,507,174 | 3/1985 | Kutrieb | 202/97 |
| 4,732,092 | 3/1988 | Gould | 110/229 |

*Primary Examiner*—Joye L. Woodard
*Attorney, Agent, or Firm*—Salzman & Levy

[57] ABSTRACT

Method and apparatus for pyrolyzing used tires into a char fraction, wire, fiberglass, oil fraction and gas fraction. The tires are continuously conveyed to a preheating chamber where they are heated to a temperature level of 200° F. to 400° F. The heated tires are metered into a cavity having disposed therein a ram system, which shapes and forces the whole tire into a pipe which leads to a pyrolyzing chamber. The tires form a plug at the front end of the system to prevent the release of toxic gases into the atmosphere and also to prevent air from entering the pyrolyzing chamber. Similarly, solid residue produced by pyrolysis of the apparatus is forced into a discharge column, forming a plug to seal the system at its outlet end. An alternate embodiment of the invention apparatus operated manually can also be used for compacting, neutralizing and disposing of medical waste, infectious materials and the like as well as auto tires.

1 Claim, 8 Drawing Sheets

APPARATUS FOR PYROLYSIS OF TIRES AND WASTE

Field of the Invention

The present invention relates to an apparatus and method for pyrolyzing tires and medical and infectious waste materials and, more particularly, to a system for pyrolyzing such material safely and continuously in a completely controlled environment.

BACKGROUND OF THE INVENTION

In recent times, there has been a proliferation of medical and other infectious waste materials from various hospitals and health centers, including clinics and doctor's offices across the country. In many cases, current disposal methods are complicated, inefficient and expensive.

Clearly, there is a need to develop a simple, efficient and less expensive method to detoxify biological and medical waste.

Regarding a seemingly unrelated subject, passenger cars and trucks on highways wear out tens of millions of tires each year. Disposal of these used tires has become a major environmental problem. A high proportion of the weight of a tire consists of carbon that reinforces the rubber in both the tread and sidewalls. Tires also contain large amounts of oil and significant quantities of steel, wire and/or fiberglass or polyester cord. All of the components are expensive and require great amounts of energy in their manufacture. Processes that allow economic recovery of these materials from tires or their conversion to other useful products from the huge stockpiles accumulating around the country are very desirable. Unfortunately, the very characteristics that makes tires long lasting and safe on the road (i.e., durability, resistance to puncture and slicing, and resistance to decomposition at moderate temperatures) combine to make tires exceptionally difficult to recycle.

The prior art teaches that rubber tires can be pyrolyzed in the absence of air at temperatures of between 600° F. and 1700° F. (depending on quality and ratio of recoverable material desired) to produce oil, gas and a solid residue that is carbonaceous in nature.

U.S. Pat. No. 3,722,403 issued to Longo discloses a compactor for compacting a slug of material. Material entering from an open hopper is compressed by a semicircular faced horizontal ram. A vertical ram then expels the material downward into an unsealed container. This is a true refuse compactor for reducing bulk refuse such as garbage to facilitate further handling.

U.S. Pat. No. 4,201,129 issued to Matthys discloses a machine for charging a furnace with scrap fuel. An open hopper, whose bottom opens into a horizontal tubular portion, is filled with scrap. One wall of the hopper acts to move fuel into the bottom of the tubular portion. The opposite wall is pivotably connected to the base of the hopper which, when lowered, forms the upper wall of the tubular lower body. A sliding gate which provides a seal between the charging hopper and firebox is opened, then a ram located in the tubular portion horizontally forces the scrap down the tube into the firebox. The ram is retracted, the gate is closed and the opposite wall is raised, thus completing the cycle.

U.S. Pat. No. 3,815,521 issued to Panning discloses a combined shredder and incinerator apparatus. Loose material is received and shredded. The shredded material is then moved into position by a bottom wall which pivotably swings upward, moving the shredded material into a space defined by a top cover and two side walls. The material is fed into an incinerator by a horizontal ram.

Both of the aforementioned furnaces operate using combustion, not pyrolysis. Each discloses a method of compacting loose, relatively bulky material into a variably compacted state that can then be forced into a furnace or incinerator, for complete combustion. In the two above devices, a partial seal is accomplished due to the inherent pressure drop across the passage through which the materials are forced into the furnace or incinerator. Due to excess air deliberately introduced into the furnaces and incinerators, any additional air that might leak past the feed fuel would have little adverse effect. Accordingly, no air tight seal is required in these systems.

U.S. Pat. No. 4,507,174 issued to Kutrieb discloses a pyrolysis chamber wherein whole tires are heated to approximately 800° F. by radiant energy emitted from radiant tubes passing through the reaction chamber in combination with convection of the product vapor within the chamber. The chamber produces char, wire, fiberglass, oil and gas. This is a batch process where each load is completely pyrolized. The system then shuts down and is allowed to cool. Solid residue is removed, and the chamber is reloaded for a new cycle.

U.S. Pat. No. 4,647,443 issued to Apffel, discloses a process for recovering carbon black, oil and fuel gas from whole, non-shredded, passenger car and truck tires. The tires are first cleaned and then preheated with super-heated steam. The process is divided into a first and second phase. The whole uncompressed tires are loaded into a reactor chamber through a series of airlock gates. The whole tires are then pyrolyzed leaving oil, gas, char, steel and fiberglass cord. The reaction chamber is heated by radiant energy emitted from radiant tubes passing through the chamber as well as by convection of the product vapor within the chamber. With this type of gate arrangement, at a minimum, a volume of gas equal to the volume of a tire escapes to the atmosphere; an equal volume of air is introduced to the reactor with each inserted tire.

U.S. Pat. No. 4,217,175 issued to Reilly discloses a pyrolysis system for pyrolyzing/combusting municipal solid waste. An inward tapered nozzle is provided in which a plug of waste forms a seal to prevent air from entering the reactor or vapor from being released into the atmosphere.

In other pyrolysis plants, tires and or other refuse are generally required to be physically broken apart into smaller pieces or fragments. Commercially available tire disintegrators include slicing machines, hammer mills, debeaders and manglers that have been adapted for tire reduction from other industries. The materials from which tires are made, such as steel reinforcing and carbon, make them very difficult and expensive to disintegrate.

U.S. Pat. No. 4,732,092 issued to Gould operates in a continuous mode using shredded refuse, including tires, to produce solid and vapor products similar those produced in the first phase as disclosed by Appfel. A ram feeder is combined with a gate to provide a feed assembly. However, this is a combined pyrolysis and combustion system, so an air tight seal is not critical.

U.S. Pat. Nos. 4,402,791 and 4,401,513 issued to Brewer disclose devices to pyrolize shredded tires producing solid and vapor products in a batch mode as is taught by the aforementioned Kutrieb patent.

The present invention has similarities to each of the above mentioned patents. However, it contains significant improvements therein, which improve both the efficiency and safety of the process of treating whole tire feed-stocks or infectious waste.

It is an object of this invention to provide a system for feeding tires and medical waste to a substantially air tight pyrolyzing reactor and for removing the products of the pyrolytic reaction on a continuous, safe basis.

It is another object of the present invention to provide a system for preheating tires directly using waste heat contained in spent stack gas before the tires enter the pyrolyzing chamber or reactor.

It is a further object of the invention to provide a system of pyrolysis that is both safe and energy efficient, and further wherein the process generates a surplus of fuel gas necessary to power the process itself within applicable laws and environmental regulations.

It is also an object of this invention to provide a pyrolyzing system in which the tires themselves, or cartons of medical or infectious waste, form a seal or plug at the front end of the apparatus and a plug at the outlet formed by a column of solid residue, including crushed char, to prevent toxic gases from escaping and to prevent air from entering the reactor. In this way, an oxygen free environment is maintained for the pyrolysis process, thus improving the safety of the system and bringing the system into compliance with safety regulations and applicable laws.

SUMMARY OF THE INVENTION

In accordance with the present invention, there is provided an apparatus for pyrolyzing used tires into useful products such as a char (carbon ash) product, wire, fiberglass and a hot vapor which, when cooled, will result in an oil fraction and a gas fraction. Whole tires are continuously inserted into a preheating chamber where they are heated to a temperature level of 200° F. to 500° F. The heated whole tires are rolled or otherwise placed in a chamber having disposed therein a ram system, which packs and shapes the whole tire into a dense rubber cylinder within a pipe which leads to a pyrolyzing chamber. This compacted rubber cylinder, from which the bulk of entrapped air has been expelled, forms a plug at the front end of the system, preventing the release of toxic gases into the atmosphere and also preventing air from entering the pyrolyzing chamber. Similarly, solid residue produced by pyrolysis of the apparatus is forced into a discharge column, forming a plug to seal the system at its outlet end. An alternate embodiment of the inventive apparatus can be used for neutralizing and disposing of medical waste, infectious materials and the like.

The pyrolytic vapor is fed to a direct contact spray chamber where the oils are condensed to a temperature level of 140° F. to 150° F. The condensed oil product is subsequently extracted.

A portion of the hydrocarbon product gas, which has a heat content of approximately 1000 BTU's per SCFM, is used to fuel the reactor, with the surplus available for space heating, generation of electricity, or the like.

The spent solid residue (char, fiberglass, wire and the like) from the pyrolysis reactor falls into a collection bin disposed beneath the reactor outlet where it is continuously removed. One wall of the bin is formed by the face of a hydraulic ram. The ram repricotates continuously to force the solid residue from the bin into the bottom of a vertical solid residue discharge column of sufficient height to cause the fragile (carbon ash fraction) char to be crushed into a granular powder as it resists the action of the ram forcing the solid residue upward through the solid residue discharge column. The crushed char causes a seal to be formed across the opening of the collection bin. The seal, combined with the solid rubber plug in the inlet (feed) pipe, isolates the reactor chamber from the possibility of vapor leakage to the atmosphere. The system design calls for negative reactor pressure of $-0.02$ to $-0.1$ inches water column. This low pressure differential, combined with an inlet rubber plug and a char seal at the outlet, preclude any significant air infiltration into the reactor.

As the solid product spills out of the solid residue discharge column, it is viewed by an infrared sensor which controls one or more water spray heads. This allows the temperature of the solid residue to be controlled within the range of 250° F. to 300° F., thereby assuring a dry product below a temperature where spontaneous combustion can occur. This solid residue may then be passed through a system of screens to separate the wire and fiberglass and to grade the char for size as required.

BRIEF DESCRIPTION OF THE DRAWINGS

A complete understanding of the present invention may be obtained by reference to the accompanying drawings, when taken in conjunction with the detailed description thereof and in which.

DESCRIPTION OF THE PREFERRED EMBODIMENT

Generally speaking, this invention pertains to an apparatus and method of treating waste materials. The method of the current invention is similar in concept to the first stage of that illustrated in U.S. Pat. No. 4,647,443; issued on Mar. 3, 1987 to Apffel, entitled: RECOVERY PROCESS.

The present invention introduces a new ram injection apparatus and method, wherein whole tires or cartons of medical or infectious waste are positioned then compressed and shaped into a cylindrically shaped plug within a feed tube leading to a pyrolysis chamber. The ram injection apparatus forms an orthogonal force system, wherein each of the respective positioning rams, compressing rams, and feeding rams are substantially at right angles to each other along X, Y and Z axes. The compressed and shaped tires and or cartons of medical waste act as a plug within the feed tube to prevent toxic gases formed in the pyrolysis treatment from escaping from the chamber and polluting the atmosphere. The plug also prevents air from entering the pyrolysis chamber during operation. This provides a system that is more efficient and safer than that disclosed in the aforementioned patent.

In another novel aspect of this invention, the exhaust gases are recycled within the system to provide the heat energy to preheat the tires. A portion of the recovered product gas is used to fuel the reactor.

In other aspects of the system, an understanding of the aforesaid patent to Apffel and others is helpful in discerning the entire recovery concept, and it is therefore a purpose to incorporate the teachings of those patents herein for the sake of brevity.

For the sake of brevity and clarity, like elements will be assigned the same designations throughout the figures.

Figure 1:
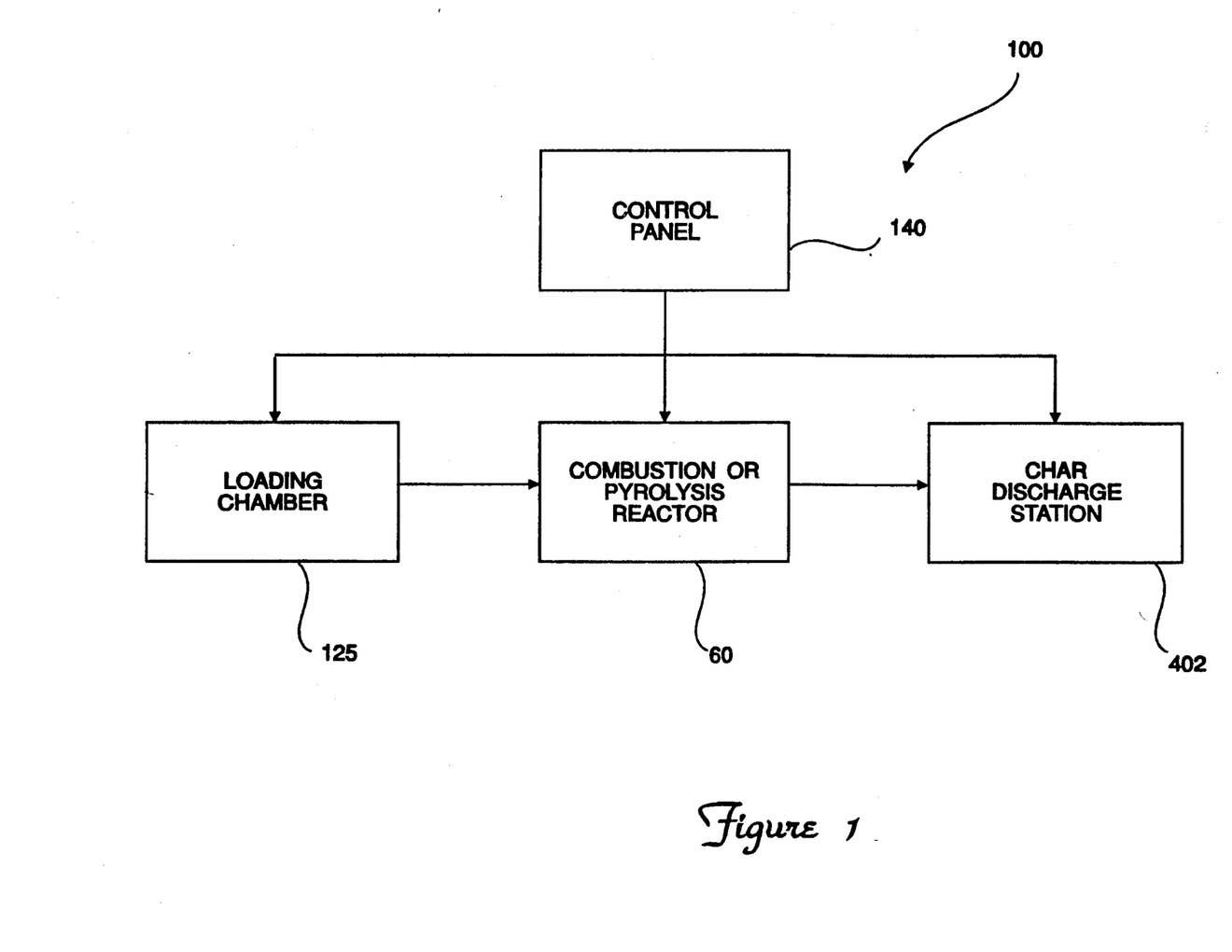
FIG. 1 is a block diagram of the pyrolysis components of the present invention.

Referring now to FIG. 1, there is shown a block diagram of the major components of the inventive pyrolysis apparatus.

A control panel 140 controls the system 100, and can be operated manually or automatically, as desired. Chambers or stations for loading the material 125, for performing pyrolysis 60 and for discharging the solid residue end product 402 are connected to one another, as shown and described in greater detail hereinbelow.

The loading chamber 125 and the ramming operation therein are illustrated in the cut away view (FIG. 2) and perspective views (FIGS. 4 through 8), described in detail hereinbelow.

Figure 3:
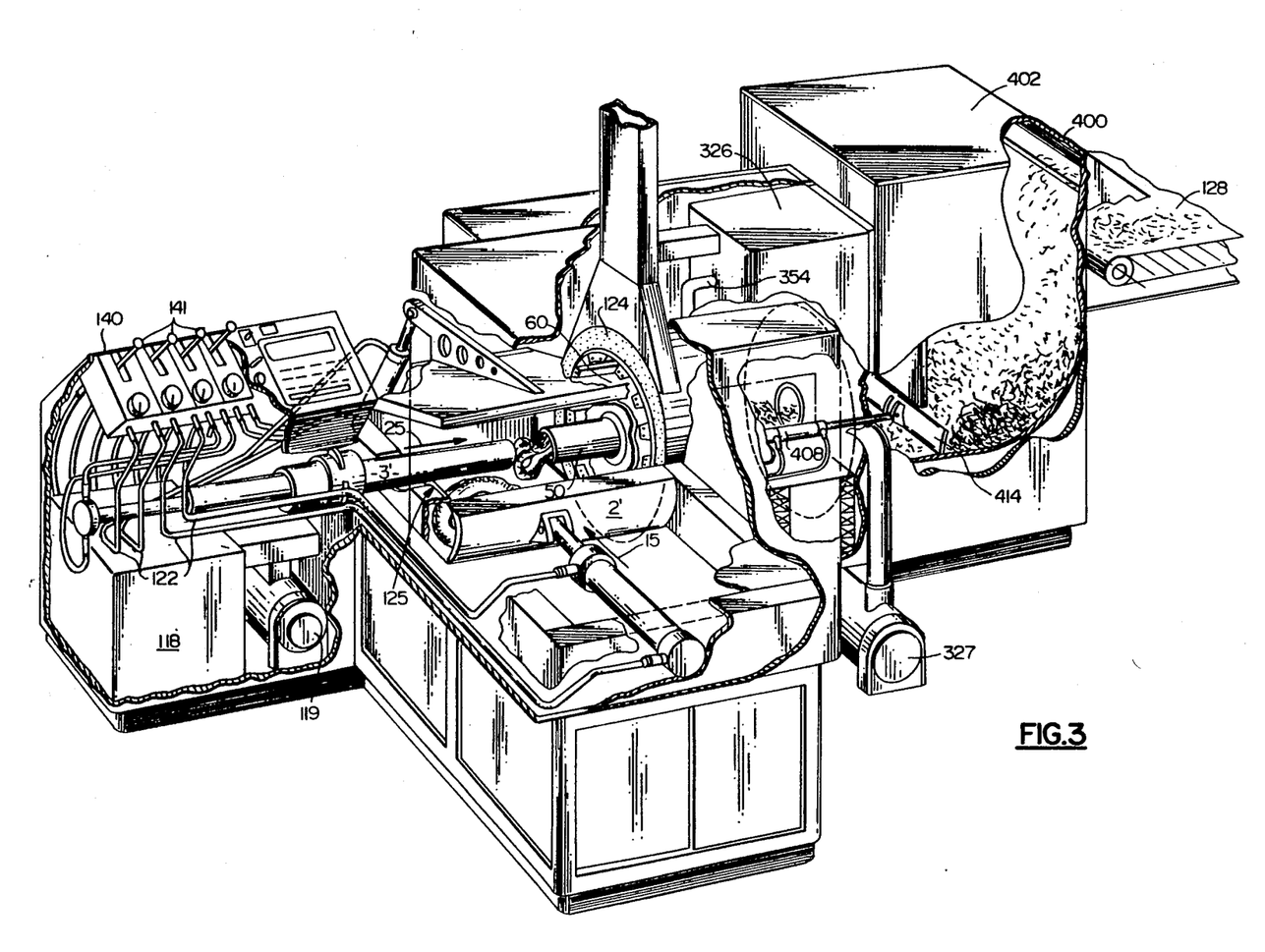
FIG. 3 is a perspective view with cut away sections of the pyrolysis apparatus.
Figure 4:
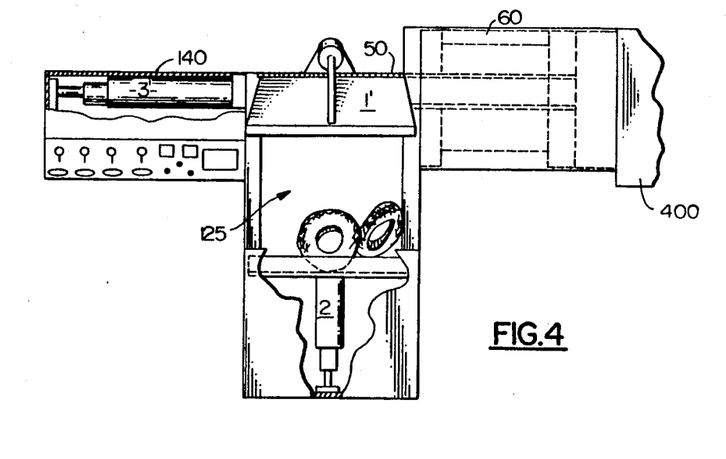
FIG. 4 is a top view of the loading chamber depicted in FIGS. 2 and 3, before the material is compressed.

A hydraulic reservoir 118 supplies a compressor 119 that respectively feeds hydraulic fluid to hydraulic cylinders 1 through 3 and other hydraulic components, as required. Reservoir 118 is disposed below the control panel 140, as illustrated in FIG. 3.

Hydraulic feed lines 122 run through the control panel 140 from the compressor 119 to each cylinder.

The control panel activates the hydraulic feeding of each cylinder via levers 121 in the manual mode of operation for tires and/or medical waste.

Figure 2:
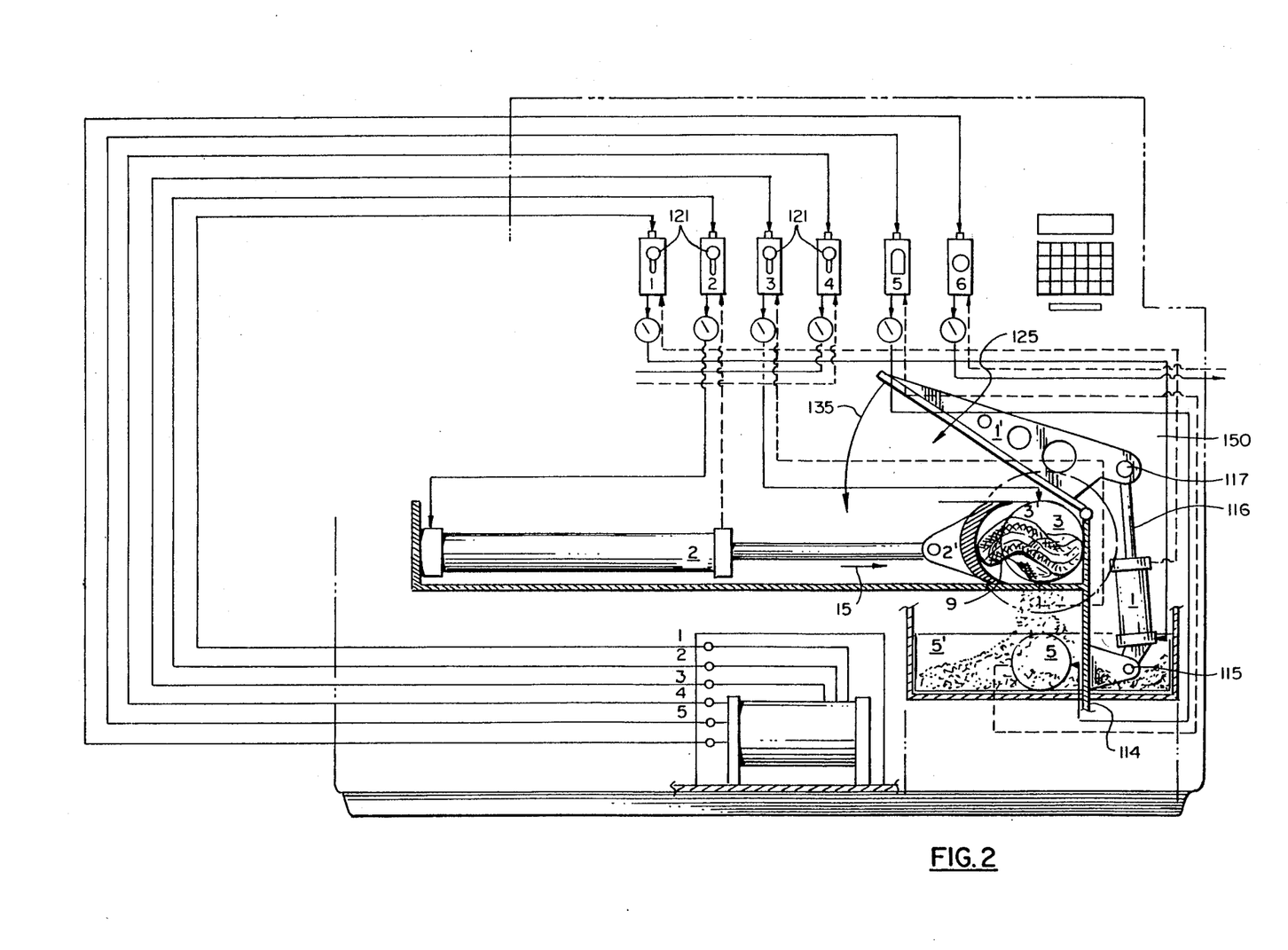
FIG. 2 is a cut away view of the loading chamber showing the novel ram apparatus.

In operation, at the rear of cavity 125 is disposed a hydraulic cylinder 1 that is pivotably attached to a support beam (not shown) at pivot point 115. The piston of cylinder 1 is pivotably attached to hinged top wall 1' (which is pivotably attached to tube 50) at pivot point 117.

A tire 9 or carton of medical/infectious waste 9a is placed into cavity 125. Hinged top wall 1' is caused to pivotably press down upon the tire 9 or carton of medical/infectious waste, as shown by arrow 135. This hinged top wall 1' holds the tire 9 or medical/infectious waste in a confined position. Ram 2' has a face consisting of a 180° segment cut from one end of feed tube 50, that segment being in the shape of a half pipe or cylinder.

When ram 2' is open, that portion of feed tube 50 from which ram 2' was cut forms one wall of cavity 125 as well as a portion of the feed tube connecting chamber 125 with reactor 60. When ram 2' is closed, feed tube 50 is reassembled to form a tube passing completely through cavity 125 and continuing on into reactor 60.

Figure 5:
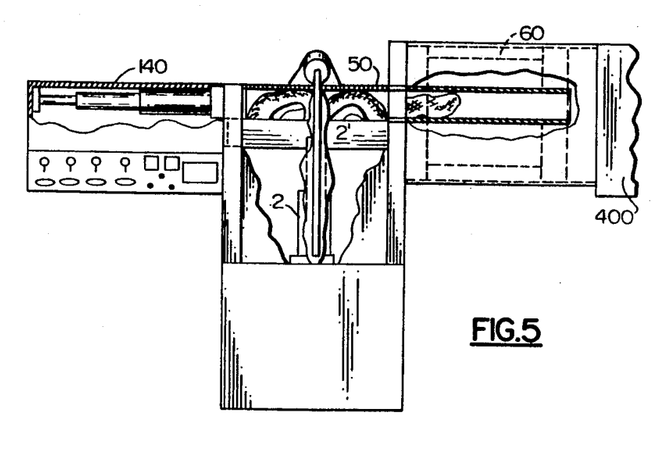
FIG. 5 is a top view of the loading chamber during the initial stage of material shaping.
Figure 6:
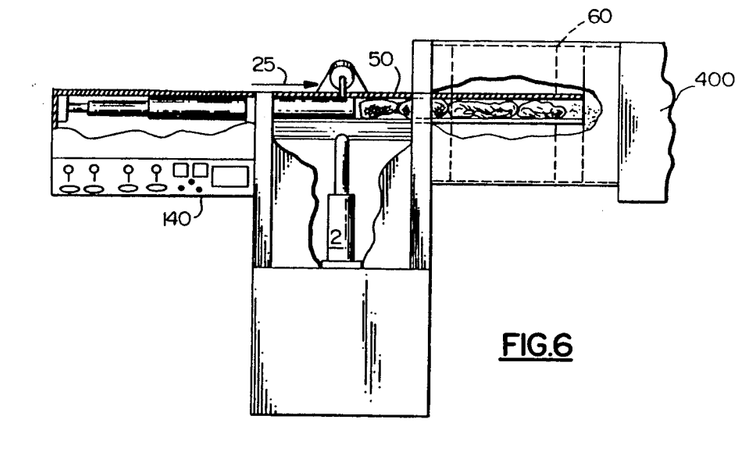
FIG. 6 is a top view of the loading chamber during the forcing of the material through the pipe entering the pyrolyzing chamber.
Figure 7:
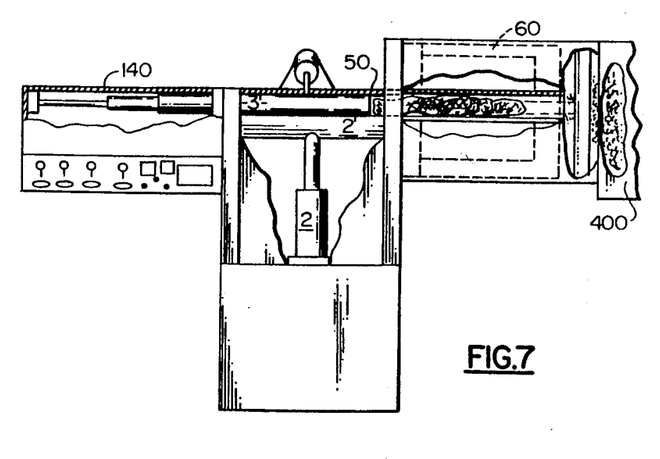
FIG. 7 is a top view of the loading chamber after the material has been loaded through the pipe and into the pyrolyzing chamber.

As ram 2' moves forward (arrow 15) feed tube 50 is reassembled into its original configuration (a tube) and incidentally shapes the tire 9 or carton of medical/infectious waste into a cylinder that tightly fits the interior of feed tube 50. Feed tube 50 must be of a size that will accept tires of a given range of sizes or cartons of medical/infectious waste and cause them to readily assume the shape of the interior of feed tube 50, thus forming a cylindrical plug effecting an air tight seal between the feed pipe 50 and tire 9 or carton of medical waste. The term "air tight" means substantially air tight at a low pressure differential. This cylindrical plug is composed of a number of tires 9 or cartons of medical waste that are metered into reactor 60 by ram 3'.

An adequate number of shaped tires or shaped cartons of medical/infectious waste must remain within feed tube 50 to effect an air tight seal.

The aforementioned compressing and shaping operation removes air entrapped in the whole tires 9 and cartons of medical waste prior to pyrolysis. This is necessary to ensure safe operation of the reactor and to prevent dilution of the end product, produced by the system.

A hydraulic cylinder 3 actuates ram 3' disposed parallel to the side walls of tire compression-shaping cavity 125 and concentrically with respect to the tube formed when ram 2' is joined with the curved bottom section of tube 50. Horizontal ram 3' engages the now compressed and cylindrically shaped tires 9 and pushes (arrow 25) the tires 9 through feed tube 50. The compressed tires form a plug which prevents toxic gases from the pyrolysis process from escaping into the atmosphere and prevents air from entering the pyrolysis chamber 60. The reactor used in pyrolysis chamber 60 may be of the rotary kiln type as discussed in U.S. Pat. No. 4,881,947 issued to Thomas H. Parker et al.

The action of the cylinders 1, 2 and 3, is determined by a control panel 140. The control levers 141 of the control panel 140 are suitably connected between the cylinders 1, 2 and 3, and hydraulic fluid. The fluid actuates the cylinders 1, 2 and 3 by means of a hydraulic pump 119 which is suitably connected to the hydraulic reservoir 118, disposed below hydraulic cylinder 3 and adjacent to hydraulic reservoir 118.

Figure 10:
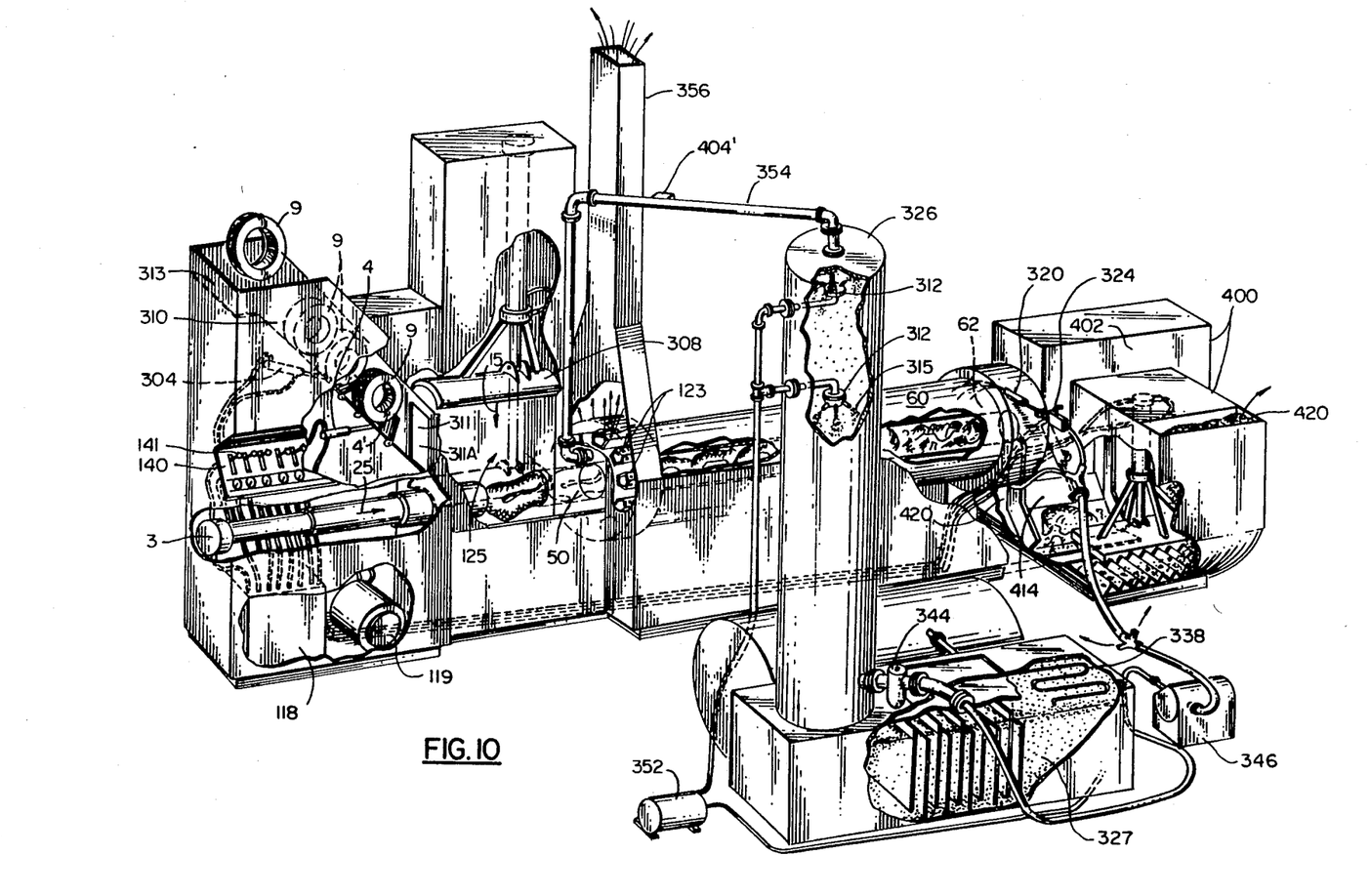
FIG. 10 is a perspective view of a two-ram feed alternate embodiment of the present invention.

Portions or all of the preceding operation of the system would likely be under manual control. Referring now also to FIG. 10, a brief description for automated control of a large volume tire pyrolysis system follows.

A microcomputerized controller, such as a PC manufactured by IBM Corp., directs the operation of hydraulic control valves and other aspects of the system automatically, programmed in a manner well known to those skilled in the art. Individual tires 9 are inserted manually or fed by conveyor into tire chute preheating bin 310 wherein tires are preheated to a temperature of 200° F. to 400° F. using waste stack gases produced from fuel burned to provide heat for the pyrolysis process. The tires 9, $9^1$, $9^2$, $9^3$ then roll down an incline formed by the bottom of bin 310 to a metering gate arrangement operated by ram 4. When signaled by the computer, ram 4 retracts, raising a chock 4' behind tire 9, restraining tires $9^1$, $9^2$, $9^3$ and opening a gate 311A in front of tire 9 allowing it to roll by gravity through opening 311 and into chamber 125. Again, when signaled by the computer, ram 4 extends, reversing the positions of metering gate arrangement closing gate 311A in opening 311 and lowering chock 4', thereby confining tire 9 in compression-shaping cavity 125 as well as preventing an excess of tires 9 from entering the tire compression-shaping cavity 125.

As the ram 2' extends (arrow 15) the tires 9 are both compressed and shaped into a resulting cylindrical plug within a tube reformed from ram 2' and the curved bottom section of tube 50.

Again, as stated above, ram 3' extends, forcing a portion of the shaped tire plug into reactor 60. An adequate number of shaped tires 9 must remain in feed tube 50 to effect an air tight seal.

Tube 50 is disposed in an opening of the pyrolyzing chamber 60 and passes through a labyrinth sealing apparatus such as that disclosed in U.S. Pat. No. 4,804,195 issued to Thomas H. Parker.

The outlet of pyrolysis chamber 60 passes through a second labyrinth seal as it enters collection station 402.

As the tires 9 or cartons of medical/infectious waste are successively pushed through (arrow 25) the tube 50, they drop into the pyrolyzing chamber 60 and are pyrolyzed, creating vapors that are drawn off by piping 354. A portion of these gases is then burned to further heat the pyrolyzing chamber 60 itself.

The pyrolyzing chamber 60 can include radiant heating elements 123 as shown in FIG. 10. The radiant heating elements 123 heat the pyrolyzing chamber 60, causing the feed material to pyrolyze. The radiant heating elements 123 are insulated by an annular insulation jacket 124 in order to conserve energy.

Of course, it is understood that the heating elements 123 may be gas-fired units, electrical units, microwave generating magnetrons, or other heat-generating devices suitable for use with the technology described herein.

In route to the outlet, the product vapors pass through the reactor counter current to the inward flow of the feedstock transferring a substantial portion of its latent heat to the incoming feedstock. The vapors leave the reactor 60 through piping 354 connected to the inlet end then passing to the oil condensing spray chamber 326.

The oils are cooled and condensed to a temperature level of 140° F. to 150° F. The condensed oil product flows downward into tank 327. The lighter gas elements, containing burnable hydrocarbons, can be used to furnish heat back to the pyrolyzing chamber itself, as aforementioned. The solid residue from the pyrolytic reduction of tires, and medical/infectious waste consists of a fragile carbon/ash fraction called char, and metal wire and fiberglass.

Figure 8:
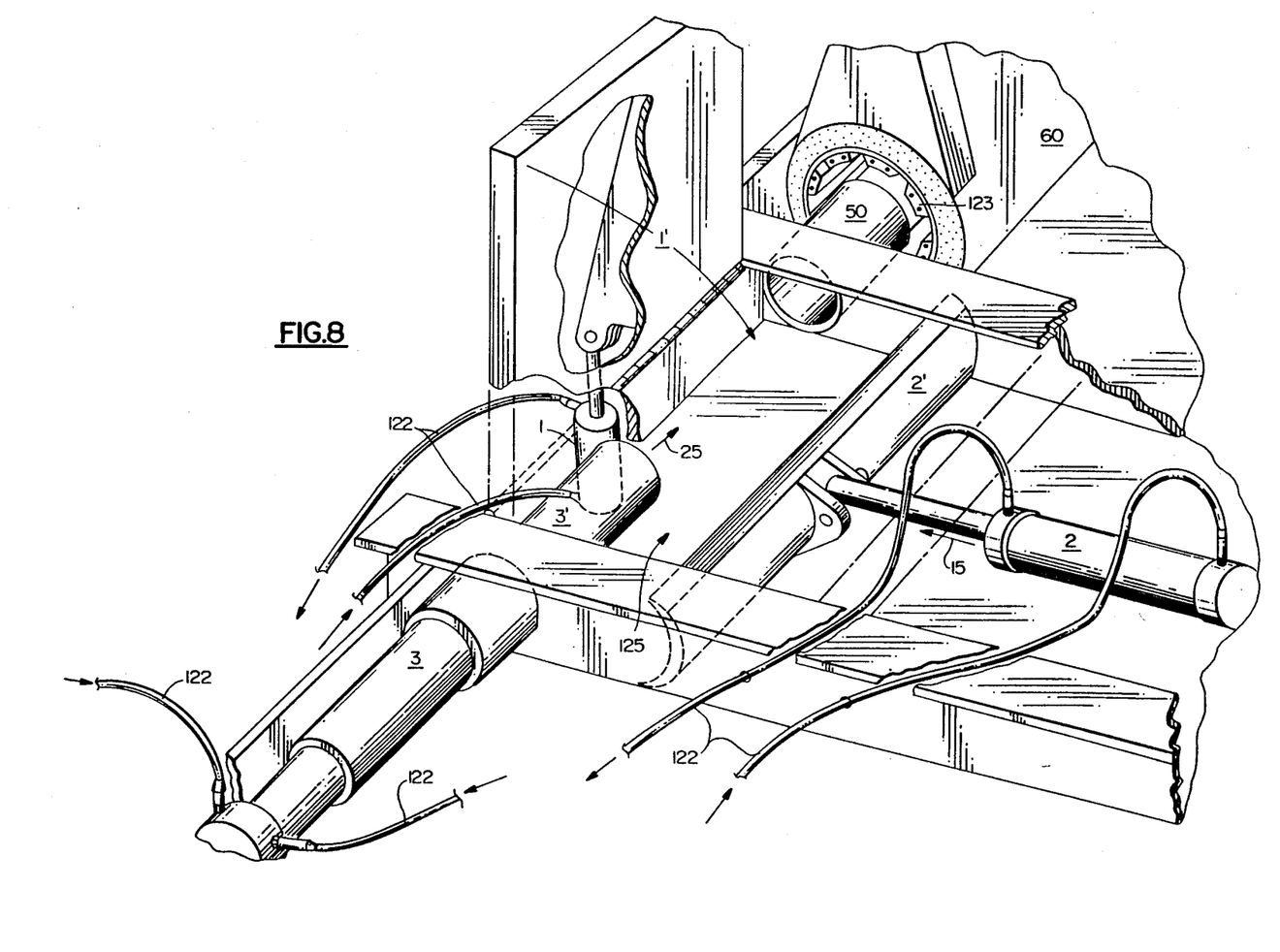
FIG. 8 is an enlarged perspective view of the ram apparatus depicted in FIGS. 2 through 7.
Figure 8A:
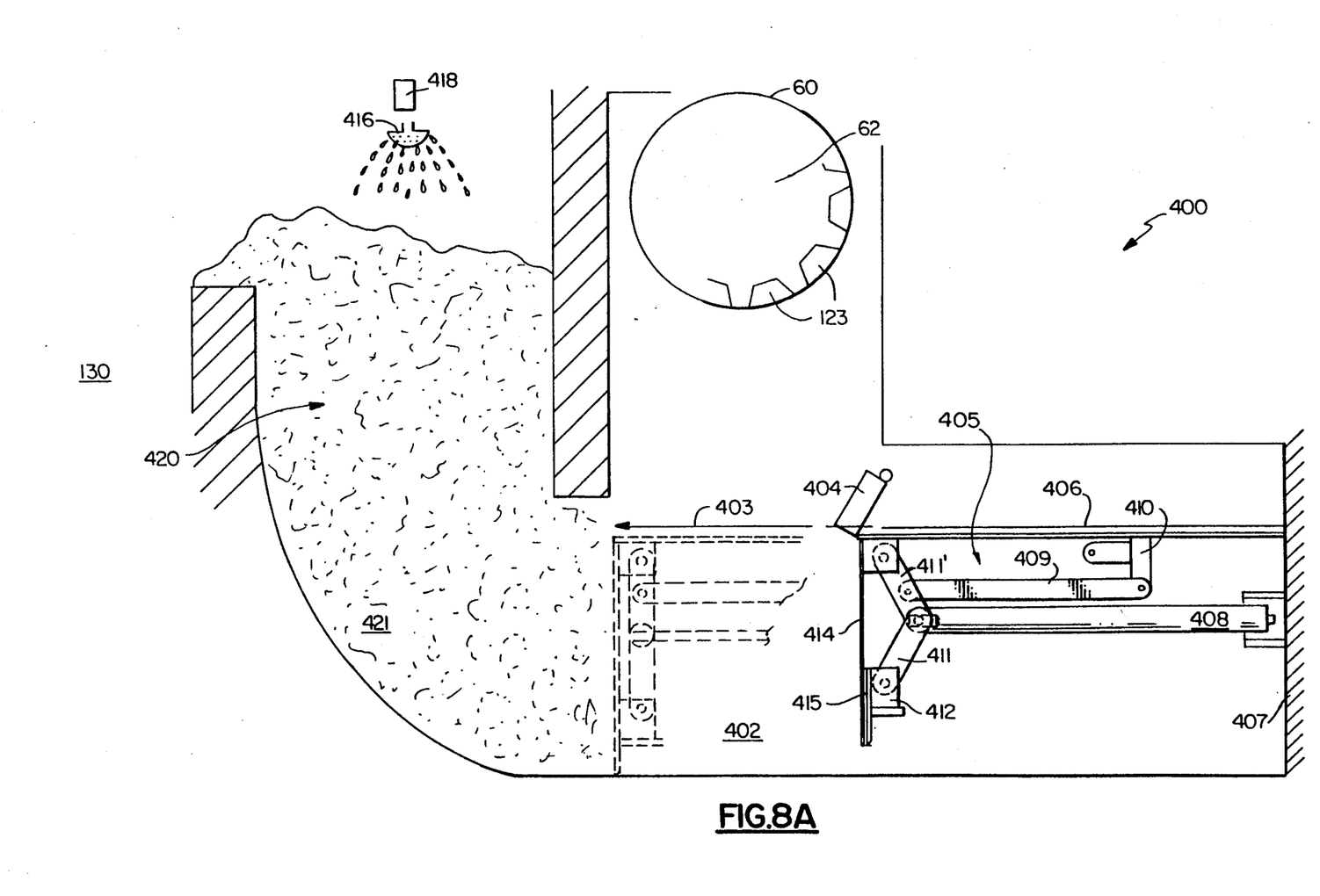
FIG. 8A is a plan view of the char discharge apparatus.

Referring now also to FIG. 8A, there is shown a mechanism for collecting the solid products of the pyrolysis and for forming a gas seal at the output thereof. A discharge apparatus 400 is used to remove solid residue after it exits the pyrolyzing chamber, not shown. The solid residue falls through outlet opening 62 in end of reactor 60 into a solid residue collection bin or dropout chamber 402. A ram assembly 414 pushes the solid residue out of bin 402, compressing and crushing the fragile char fraction as it, along with the remainder of the solid residue, is forced into an outlet at the base of a char discharge column 421.

In operation, hydraulic ram cylinder 408, disposed on the side wall 407 of the collection bin 402, actuates solid residue discharge ram 414 and discharge ram extension 412 along sliding tracks 415 disposed on char discharge ram 414. Solid residue discharge ram 414 and discharge ram extension 412 are connected to hydraulic ram cylinder 408 by hinge arms 411 and 411', respectively.

When ram assembly 405 is in the retracted position, as shown, solid residue discharge ram extension 412 is retracted vertically upward. Before solid residue discharge ram 414 can be extended by hydraulic ram cylinder 408, discharge ram extension 412 must be fully extended vertically downward by hinge arms 411, 411'.

As the hydraulic ram cylinder 408 extends, hinge arms 411 push discharge ram extension 412 downward. In a similar manner, discharge ram extension 412 must be fully retracted before char discharge ram 414 can be retracted. As hydraulic ram cylinder 408 retracts, hinge arm 411 pulls discharge ram extension 412 upward. This operation allows char, steel and glass (solid residue) to be pushed out of solid residue collection bin 402 without dragging residue back into the bin during retraction of char discharge ram 414.

As the ram assembly 414 retracts, a scraper bar 404 clears solid residue off the top of the ram assembly. When the ram assembly 414 is fully retracted, a latch assembly 410 pivots upward and locks the ram assembly 405 into a ram latch bar 406 disposed above the retracted assembly 405. Latch assembly 410 is connected to hinge arm 411' by a latch control rod 409. As the ram assembly 405 retracts, hinge arm 411' is pulled toward the latch assembly 410 and causes it to be pushed upward until it locks into ram latch bar 406.

As the solid residue is pushed out of the solid residue collection bin 402, it is compressed and crushed and forced upward into solid residue column 420. As solid residue column 420 fills, a plug 421 of crushed solid residue is formed to prevent the escape of toxic gases into the atmosphere and to prevent air from entering the pyrolysis chamber.

An intermittent water spray 416 cools the hot char, steel and glass (solid residue fraction) to a temperature of 250° F. to 300° F. as it is discharged. An infrared sensor 418 monitors the temperature of the top surface of the solid residue plug and triggers water spray 416 as needed. When the char reaches the top of char column 420, it spills over into a char storage bin, not shown, or is conveyed away by a conveyor belt 128, for separation into its various fractions.

The pyrolyzing chamber 60 is preferably constructed of high temperature alloy steel or refractorily lined steel. The energy to heat the tires is achieved by the plurality of radiant tubes 123. Each of the radiant tubes 123 is heated internally to a temperature level sufficient to maintain reactor temperature. Heat is transferred from the tubes 123 to the tires moving through the tire pyrolysis chamber 60 by radiation, convection and conduction. The tires are heated to temperatures of at least 600° F., devolatilizing them. The volatile hydrocarbon vapors exit through an insulated product vapor duct 354 to a direct contact cooling and condensing chamber 326.

The temperature in the vapor duct 354 is measured by a temperature sensor 404. The amount of fuel provided to the burner 320 is controlled by valve 324 as a function of the temperature in duct 354.

The burned gases produced in the radiant tube 123 exit at a temperature of 600° F. to 800° F. through a flue collector 356. Some of this exhaust gas enters flue gas duct 308 and is used to preheat the tires 9. These gases are not products of the pyrolysis process but rather are products of the elements that induce the pyrolysis process. The heated gases enter the tire chute 310 via flue gas duct 308 (arrows 307) with the aid of an induced draft fan 313 mounted on a wall of the tire chute 310.

During pyrolysis, hydrocarbon vapors separate from the tires in the pyrolysis chamber 60 and exit through product vapor duct 354. The hot vapor, at temperatures of 400° F. to 600° F. and negative pressures of −0.02 to −0.1 inches water column are fed to a direct contact cooling and condensing spray chamber 326. The direct contact cooling and condensing spray chamber 326 is designed to cool and condense the pyrolitic vapor into a gas fraction and liquid fraction and to separate any solid particulates that may have been carried by the pyrolyzed tire vapors.

Inside condensing spray chamber 326 are spray heads 312 which spray a cool oil mist 315 to cool the superheated products of the pyrolytic reaction of the feed stock, condensing those fluids with a boiling point above 150° F., trapping any entrained solid particulate and separating the gaseous fraction for removal.

Pyrolytic oil flows into a sedimentation tank 327 equipped with a series of weirs arranged so as to seal against the escape of the gas fraction, trap floating particulate and additionally trap heavier particulate as it sinks to the bottom of the tank. Tank 327 is additionally equipped with heat exchange coils 338 to facilitate cooling the product oil to a temperature of 75° F. to 80° F. as this oil flows to pressure pump 352 which is suitably connected to spray heads 312 within spray chamber 326. Surplus product oil flows or is pumped to a storage facility, not shown.

The gaseous fraction passes through a coalescing filter 344 to remove entrained liquids. The gas is then compressed to a pressure of 5 to 8 psig in compressor 346. This compressor 346 creates the required negative system pressure at a level of −0.02 to −0.1 inches water column. This may be accomplished by varying the pump speed in direct response to a signal from a pressure sensor in duct 354.

A portion of this gas passes to burner 320 through a fuel control valve 324 to provide heat for the pyrolysis process, which is endothermic.

The remaining gas may be used as a fuel gas for space and or process heating or as fuel for an electricity generating system. Thus, the system is partially self-regenerating. The solid residue containing the steel, fiberglass and char drop out of reactor 60 and fall into the solid residue collection bin 402. Ram 414 (FIG. 8A) forces the solid residue into the bottom 421 of solid residue discharge column 420, crushing the fragile char residue into a granular powder. The char, combined with wire and fiberglass, is forced upwards through and out of discharge column 420, to create a seal to prevent vapor from escaping, or air from entering the reactor.

OPERATION OF THE SYSTEM

Figure 9:
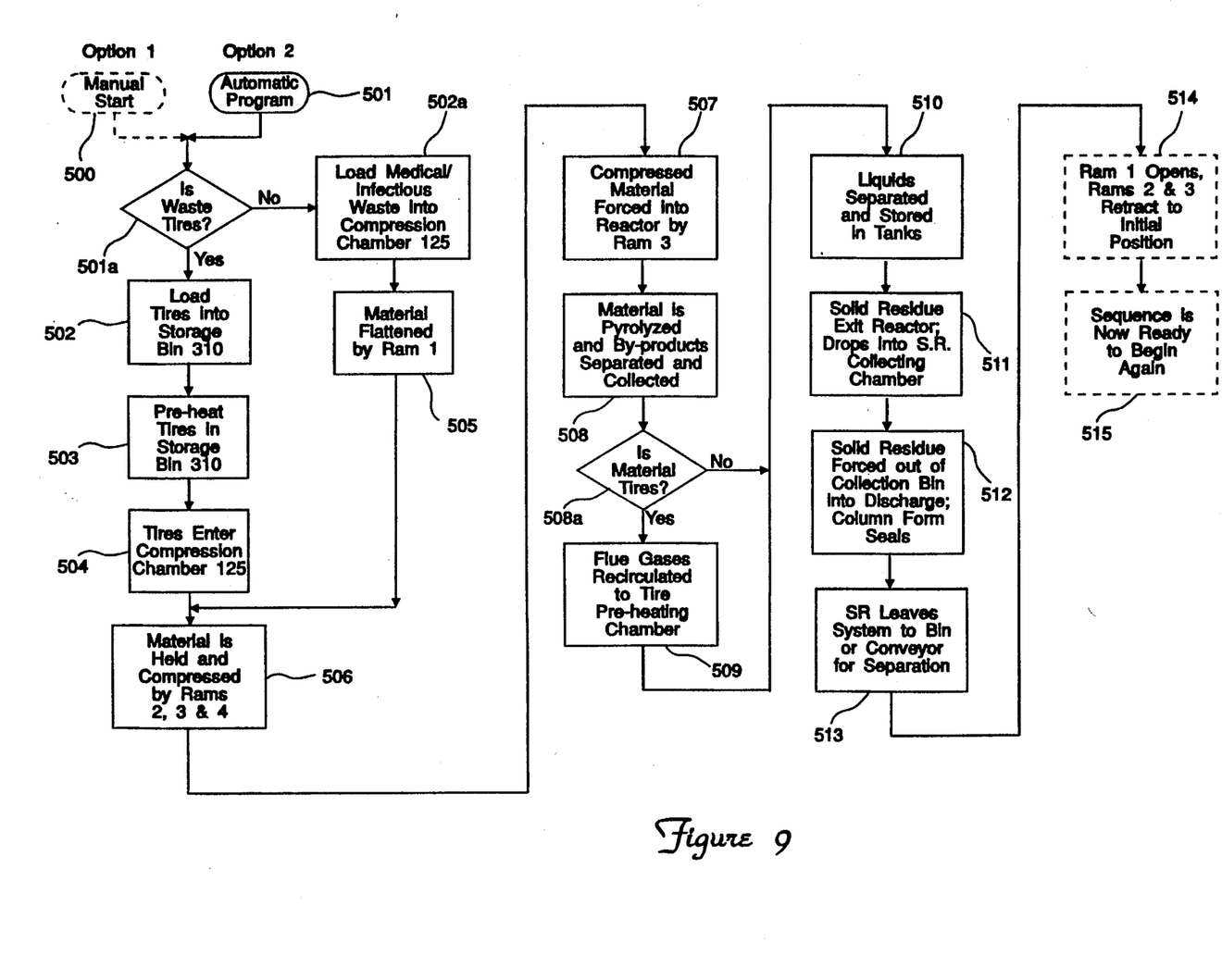
FIG. 9 is a flow chart of the pyrolysis process of the invention.

For a description of the operation of the system described with reference to FIGS. 1 through 8 and FIG. 10, refer now to the flow diagram of FIG. 9.

In relatively low volume tire pyrolysis systems or systems dedicated to medical waste, manual operation is indicated and preheating may not be advised. For purposes of this description, manual steps are represented in FIG. 9 with phantom lines. All other steps are performed automatically in the preferred embodiment.

Medical/infectious waste or tires are manually loaded into compression-shaping cavity 125, step 502a.

The tires 9 are loaded into bin 310, step 502. Next, tires 9 are preheated, step 503.

The preheated tires enter compression-shaping chamber 125, step 504.

The lid 1' positions the medical/infectious waste or tires, step 505, in preparation for shaping the waste by ram 2', step 506.

Ram 2' closes cavity 125 and shapes carton or tires into a cylindrically shaped plug that conforms to inside diameter of tube 50, step 506.

Ram 3' pushes the compacted and shaped material through tube 50 and into pyrolysis chamber 60, step 507.

The material in chamber 60 is then pyrolyzed, step 508.

The vapor product flows into direct contact spray chamber 326, step 509, where it is cooled, condensing the liquid (oil), which flows through sedimentation tank 327, step 510.

Solid residue exits reaction chamber 60 and drops into solid residue collection chamber 402, step 511.

Solid residue is forced out of bin 402 into the base of solid residue discharge column 420, forming a solid residue plug 421 within discharge column 420 to seal the system, step 512.

Solid residue leaves column 420, dropping on conveyor 128 where it is removed to be separated, step 513. Automatic operation terminates at this point and manual operation resumes.

Cylinders 1, 2 and 3 are retracted, allowing the operation to proceed again from the beginning, steps 514 and 515.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented by the subsequently appended claims.

What is claimed is:

1. A system for pyrolyzing whole, used tires to recover solid residue and oil and gas products, the whole, used tires being flexibly shaped and compressed into a feed tube to provide a seal for a pyrolyzing chamber, said system comprising:

a pyrolyzing chamber having gas-fired heating means for heating and pyrolyzing tires to produce gas, oil and solid residue, said pyrolyzing chamber including an inlet tube for introducing tires thereof;

a compression-shaping chamber having an opening for receiving whole, used tires, said compression-shaping chamber comprising(i) a movable holding lid actuatable over the opening of said compression-shaping chamber for holding the whole tires in a confined position, (ii) a hydraulically-operated shaping ram for compressing and shaping the whole tires held in the confined position, and (iii) a forcing ram movably disposed in said compression-shaping chamber for forcing the compressed and shaped whole, used tires through the inlet tube into the pyrolyzing chamber in the form of a sealing plug;

preheating means connected to the opening of said compression-shaping chamber for preheating the tires with spent flue gases form the heating means prior to their being fed into said compression-shaping chamber.

* * * * *